United States Patent
Wiley

(10) Patent No.: US 8,644,578 B1
(45) Date of Patent: Feb. 4, 2014

(54) METHOD AND APPARATUS OF IDENTIFYING OBJECTS OF INTEREST USING IMAGING SCANS

(75) Inventor: David Wiley, Woodland, CA (US)

(73) Assignee: Stratovan Corporation, Sacramento, CA (US)

( * ) Notice: Subject to any disclaimer, the term of this patent is extended or adjusted under 35 U.S.C. 154(b) by 0 days.

(21) Appl. No.: 13/489,404

(22) Filed: Jun. 5, 2012

Related U.S. Application Data

(63) Continuation-in-part of application No. 12/430,545, filed on Apr. 27, 2009, now Pat. No. 8,194,964.

(60) Provisional application No. 61/047,982, filed on Apr. 25, 2008, provisional application No. 61/525,165, filed on Aug. 18, 2011.

(51) Int. Cl.
*G06K 9/00* (2006.01)

(52) U.S. Cl.
USPC .......................................................... 382/131

(58) Field of Classification Search
USPC ........................... 382/128–132, 236; 600/407
See application file for complete search history.

(56) References Cited

U.S. PATENT DOCUMENTS

| | | | | |
|---|---|---|---|---|
| 8,041,619 B1 * | 10/2011 | Liu et al. | | 705/35 |
| 8,047,993 B2 * | 11/2011 | Shau et al. | | 600/453 |
| 8,064,673 B2 * | 11/2011 | Kirchberg et al. | | 382/131 |
| 8,068,650 B2 * | 11/2011 | Kumar et al. | | 382/128 |
| 8,073,226 B2 * | 12/2011 | Farag et al. | | 382/131 |
| 8,077,954 B2 | 12/2011 | Kale et al. | | |
| 2004/0070583 A1 | 4/2004 | Tsai et al. | | |
| 2005/0165296 A1 * | 7/2005 | Ma | | 600/410 |
| 2007/0047794 A1 | 3/2007 | Lang et al. | | |
| 2008/0030497 A1 | 2/2008 | Hu et al. | | |
| 2010/0278405 A1 * | 11/2010 | Kakadiaris et al. | | 382/131 |
| 2011/0188706 A1 * | 8/2011 | Zhou | | 382/103 |
| 2011/0286648 A1 * | 11/2011 | Sharif et al. | | 382/131 |
| 2012/0121153 A1 * | 5/2012 | Xue et al. | | 382/131 |
| 2012/0177267 A1 * | 7/2012 | Chen et al. | | 382/131 |

* cited by examiner

*Primary Examiner* — Nathan Ha
(74) *Attorney, Agent, or Firm* — Pillsbury Winthrop Shaw Pittman LLP

(57) ABSTRACT

In general, embodiments of the invention comprise systems and methods for delineating objects from imaging scans. According to certain aspects, methods of the invention include aggregating homologous objects from multiple scans into categories, developing profiles or characteristics for these categories, matching newly identified objects to these pre-existing categories for object identification, and red-flagging, or visualization of identified objects.

14 Claims, 4 Drawing Sheets

METHOD AND APPARATUS OF IDENTIFYING OBJECTS OF INTEREST USING IMAGING SCANS

CROSS-REFERENCE TO RELATED APPLICATIONS

The present application is a continuation-in-part of U.S. application Ser. No. 12/430,545 filed Apr. 27, 2009, now U.S. Pat. No. 8,194,964, which claims priority to U.S. Provisional Application No. 61/047,982 filed Apr. 25, 2008. The present application also claims priority to U.S. Provisional Application No. 61/525,165 filed Aug. 18, 2011. The contents of all such applications are incorporated herein by reference in their entirety.

FIELD OF THE INVENTION

The present invention relates to imaging systems, and more particularly to analyzing images to detect objects of interest.

BACKGROUND OF THE INVENTION

Object segmentation has been of interest since the advent of 3D imaging technology such as MRI (magnetic resonance imaging) and CT (computed tomography). In medical imaging, segmentations of anatomic regions allow morphologic analysis of anatomy for the purpose of disease detection, diagnosis, progression monitoring, and treatment planning. For example, orbital fractures generally result from a force applied directly to the globe (eyeball) with disruption of the bony orbital architecture. This effectively distorts the orbital volume and dislocates the globe and surrounding structures to conform to the new orbital contour. Delineating the bony orbit from a CT scan of a human head provides additional information, such as volume and shape, to a surgeon when treating orbital fractures.

FIG. 1 is a CT scan of a human head with an axial slice through the orbits. The dotted line shows the boundary of an orbit. It is implicitly defined by the surrounding bone and there is no reliable functional boundary at the anterior opening or at the optic nerve canal. Label A represents the orbit region to be delineated. Labels B through F represent problem areas for segmentation methods B indicates thin nasal bones which are poorly represented by CT. Additionally, sinusitis (fluid in the sinuses) obfuscates this region. C indicates the anterior opening which has no bony boundary. Due to swelling of the soft tissue in this area for most trauma patients, it cannot be reliably used as a boundary. D and E indicate the orbit interior contains extraocular muscles and fat and often contains air, puss pockets, and bone fragments in trauma patients. Additionally, there can be large fractures in any of the orbital walls. F indicates the optic nerve canal which does not have a bony boundary.

Current methods for measuring orbital volume from CT scans include manually outlining the orbital contents slice-by-slice from an axial CT scan. This technique is tedious and typically requires over an hour. The interoperator variability and time required preclude routine clinical use of this manual method. A fast, automatic, repeatable and accurate method that obtains the quantitative morphological measurements of orbital volume can significantly aid in diagnosis and treatment of orbital injuries.

3D segmentation methods typically rely on a gradient boundary surrounding the region being segmented. However, orbits do not have a well-defined gradient boundary and the vast majority of the region's boundary is not defined functionally. This problem defining orbits extends to a wider variety of segmentation applications.

U.S. Pat. No. 8,194,964, commonly owned by the present assignee, dramatically advanced the state of the art by providing powerful technologies for identifying anatomic regions of a person delineated from image data. The present inventors have recognized that aspects of this technology can be adapted and extended for other medical and scanning image segmentation applications.

SUMMARY OF THE INVENTION

In general, embodiments of the invention comprise systems and methods for delineating objects from imaging scans. According to certain aspects, methods of the invention include aggregating homologous objects from multiple scans into categories, developing profiles or characteristics for these categories, matching newly identified objects to these pre-existing categories for object identification, and red-flagging, or visualization of identified objects.

In accordance with these and other aspects, a method according to the invention includes obtaining image data characterizing a region that includes an object of interest; locating a kernel at a starting point in the region; and moving the kernel within the region to delineate boundaries of the object of interest.

DETAILED DESCRIPTION OF THE PREFERRED EMBODIMENTS

Figure 1:
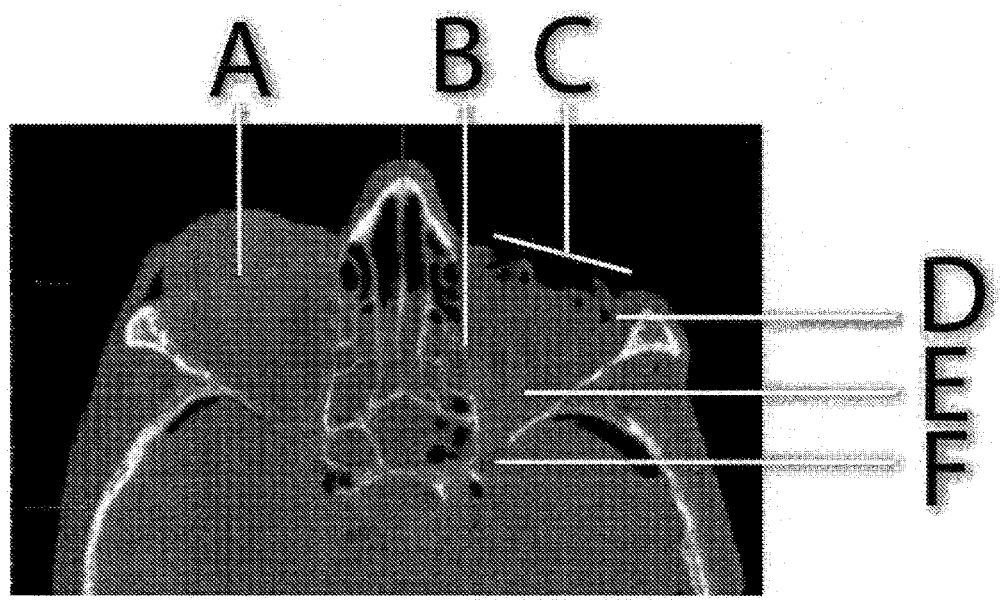
FIG. 1 is a CT scan of a human head with an axial slice through the orbits.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, the present invention extends the core technology of U.S. Pat. No. 8,194,964 to other medical imaging applications.

In general, such extensions include a novel kernel-based segmentation method capable of consistently delineating ill-defined object boundaries from 3D image data. Functional gradients in image data typically define an object's boundary and segmentation algorithms are designed to find this distinguishing feature. However, a boundary may instead be implied by some "distant" region in the image data without any functional gradient to describe the boundary. Using a multi-voxel kernel (e.g. sphere), embodiments of the invention are able to delineate implicit boundaries. One algorithm begins by defining the kernel shape and size, and positioning it inside the object being segmented. The algorithm then moves the kernel outward in a flood-fill fashion while the newly traversed voxel intensities continue to satisfy predetermined criteria (e.g., mean value is above some threshold). The size and shape of the kernel prevents it from escaping through holes in ill-defined boundaries. Aspects of these and other embodiments include: a) A region growing methodology based on a multi-voxel kernel; b) Robust handling of ill-defined object boundaries, holes, touching objects, and CT artifacts; c) An easy to use formulation for applying this method to several real-world applications.

The present inventors recognize that the orbit contour extraction process is fundamentally an image segmentation problem for which there is a tremendous amount of research available. However, the employed segmentation method should be able to consistently and accurately delineate regions where no boundary information is present (e.g., the anterior opening). In addition, the method is preferably be robust to noise, poor image representation, and variation in anatomy due to trauma. The technical challenge lies in accurately and reliably extracting the orbit contour from patient CT scans while requiring a minimum of the surgeon's time. An overview of conventional segmentation methods are summarized below.

Thresholding: These methods are typically binarization algorithms that separate an object from its background by identifying those voxels that are either above or below a certain intensity threshold. This assumes that the object being segmented has both a uniform and different intensity value than the rest of the data and a well-defined boundary. Several suggestions on selecting an optimal global or local thresholding have been proposed. Thresholding cannot resolve touching objects or segment objects with implicit boundaries. It is also sensitive to noise, heterogeneous intensity regions and inconsistencies.

Isosurfacing: These methods are based on classifying voxels with intensities equal to an isovalue and extracting a surface defining the boundary of the object at that value. Like Thresholding methods, these rely on a well-defined continuous isovalue representing the boundary which might not be present in cases where the boundaries are perceptually implied, such as the anterior opening of the orbit, or the optic nerve canal.

Deformable models and Level Set methods: With the introduction of Snakes by Kass et al. in 1988, active contour models have gained significant traction in research and industrial applications and have been applied to 2D and 3D segmentations for a wide variety of image data. Active contour models are surfaces defined within an image or volume domain that deform under the influence of internal and external forces. External forces deform the model to conform to maintain the smoothness and topology of the deformable model. External forces are typically controlled by the intensity gradient, which is absent in cases where the boundaries are perceptually implied. These forces are also sensitive to noise and spurious edges and can get "stuck" in undesirable local minima. Recently, an active volume model for 3D segmentation has been proposed and applied the method to a variety of medical imaging applications. However, this method requires the atlas model to have a similar structure shape, size and topology as the object being segmented. The atlas must be carefully oriented and placed inside the region, either completely or largely overlapping with the object. This method also explicitly maintains the topology of the atlas during deformation to prevent degenerate surface triangulations, which is computationally expensive.

Level set methods use curves and surfaces of higher-dimensional functions. A level set is an isosurface of the function. Unlike deformable models, a level set surface does not need explicit parameterizations to force topology constraints, making them more malleable than deformable models. However, the image gradient guides the evolution of a surface, which makes it sensitive to noise and irregularities.

Region Growing: Like Thresholding, these methods are based on the assumption that the voxel intensities of the object of interest are distinguishable from its surroundings. Starting from a seed location, the algorithm grows the region based on the intensities of each new voxel. Variants of this method modify the region growing criterion, the number and initialization of seed points. The main challenge in such methods is establishing robust criteria to stop the growing process.

Other: Graph cuts, neural networks, watershed transform, statistical methods such as Bayesian classifiers, maximum likelihood, Morse-Smale complex analysis, K nearest neighbor classification, comprise some of the many other segmentation methods commonly used for segmentation. These typically require some local functional description of the object boundary which limit them from successfully segmenting ill-defined objects, such as orbits.

In general, embodiments of the invention comprise image segmentation methods to address the issue of consistently finding implicit boundaries while being robust to noise. Embodiments of the invention are analogous to the tumbler finishing process in manufacturing for polishing parts. In manufacturing, a part is placed into a vat of abrasive media which can be specifically chosen for the desired finishing process whether it be polishing, de-burring, rust removal, etc. The shape and size of the abrasive object (our kernel) determines how well it works itself into the nooks and crannies of the manufactured part when the vat is vibrated for several hours.

For manufacturing, the abrasive kernels work from the outside inward to define the outside surface of the object. For image segmentation, embodiments of the invention use a single kernel object that is virtually moved in three dimensions in a flood-fill manner. The kernel is initially placed inside the object and is iteratively guided outward until it meets the object boundary. Embodiments of the invention can also simulate the outside-inward process as well with proper setup.

Embodiments of the invention comprise a region growing method, but with increased stability since at each iteration it considers the intensities of several voxels to guide the growing process. This increases the kernel's visibility beyond a single voxel, providing robust footing to decide when to expand and when to stop the growing process. With this robust macroscopic view, embodiments of the invention are able to separate touching objects by manipulating the shape and size of the kernel. The kernel can be placed anywhere inside the object; its initial position generally does not affect the resulting segmentation.

A general method flow according to embodiments is now described.

1. Defining a 3D kernel: in most cases, a sphere will suffice. The kernel is preferably smaller than the object to be segmented and bigger than any expected holes in the boundary.

2. Determine movement criteria: Each time the kernel moves, the minimum, maximum, mean, and standard deviation {min, max, mean, std} of the "to be" traversed voxels are pre-computed. Based on these parameters, one must determine criteria required to decide whether or not to accept or reject the new voxels. This can be as simple as comparing the mean value to a constant threshold or more complicated as needed.

3. Choose a start location: This can either be done manually or by some automatic process. Once this is established, the neighboring voxel coordinates and direction of movement from the current position {i,j,k,dir} are placed in a queue that drives the flood-fill process.

4. Perform a flood-fill process as follows:

a. Remove a position from the queue and compute the minimum, maximum, mean, and standard deviation of the voxel intensities that would be included if the kernel were to move to that position.

b. Compare the minimum, maximum, mean, and standard deviation to the criteria established in Step 2 and decide whether these new voxels are acceptable or not.

c. If not acceptable, do nothing more. If acceptable, move the kernel to this new position and add all of its neighbors to the flood-fill queue.

d. Repeat Step 4.

5. Completion: The process stops when the flood-fill queue is empty. The object is then represented by all the voxels traversed by the kernel object. A surface can be extracted by simply isosurfacing the boundary of the marked voxels.

FIG. 2 illustrates an overview of the inventive process in 2D. At each step, the method considers the minimum, maximum, mean and standard deviation of the intensity values contained within the set of newly traversed voxels. The kernel keeps moving to the right until the intensities of the newly traversed voxels fail to satisfy the pre-determined criteria.

Figures 2A, 2B, 2C, 2D:
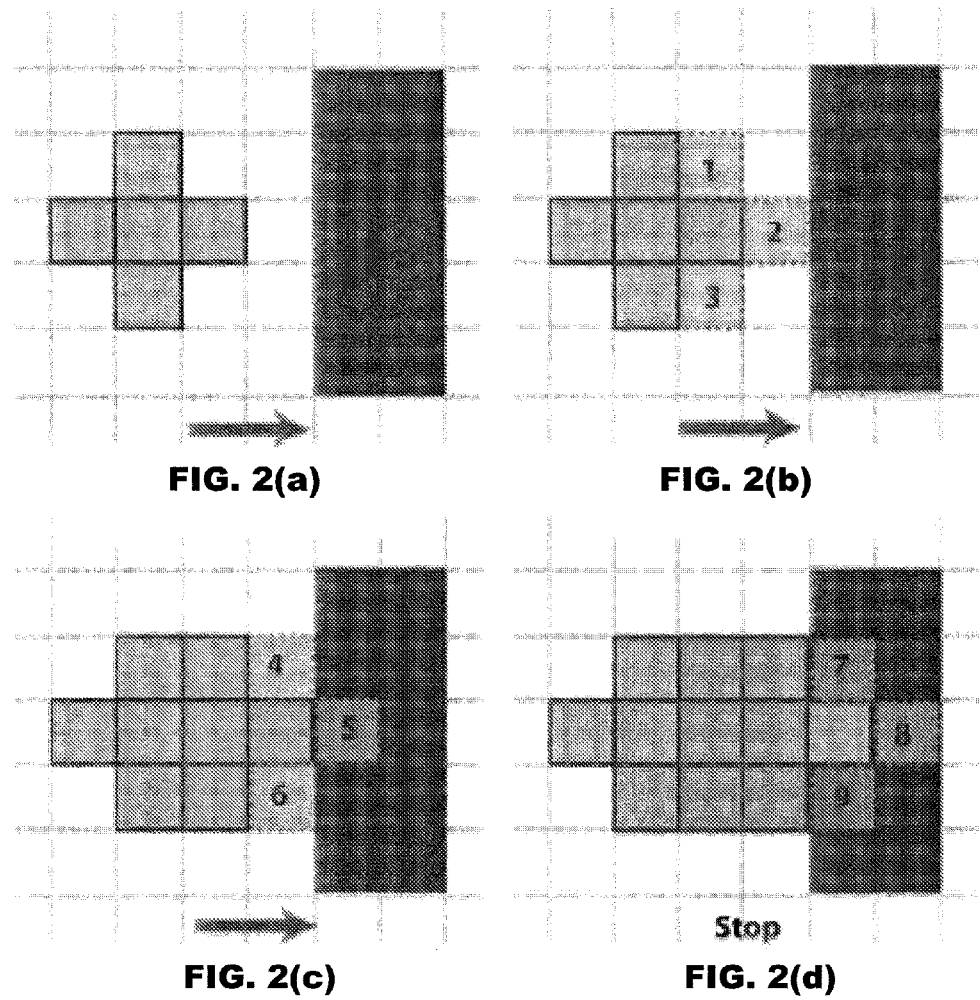
FIGS. 2(a) to 2(d) illustrate some aspects of a general object segmentation process according to embodiments of the invention.
Figure 3A:
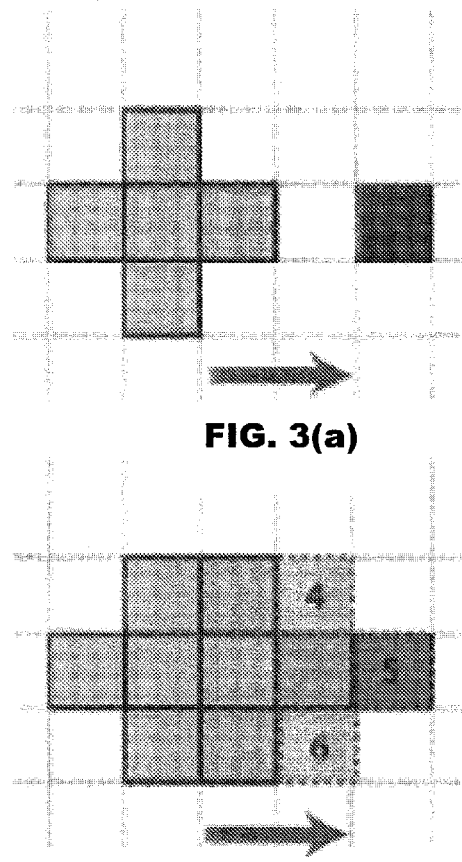
FIGS. 3(a) to 3(d) illustrate additional aspects of a general object segmentation process according to embodiments of the invention.
Figure 3B:
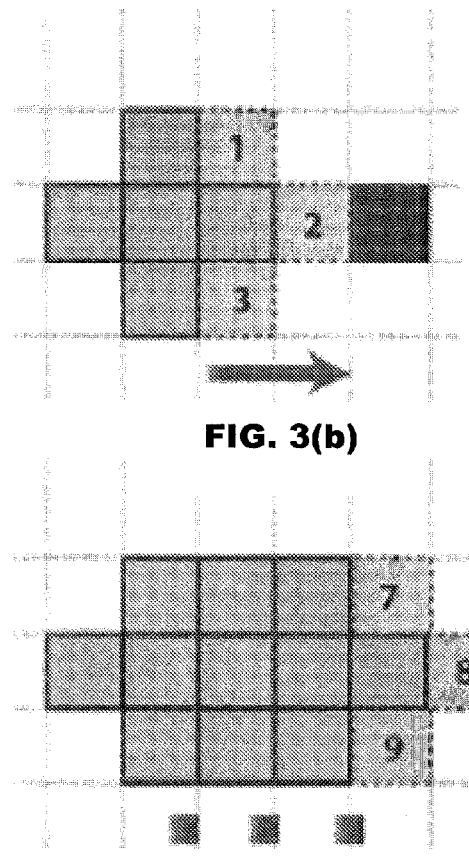
Figure 3C:
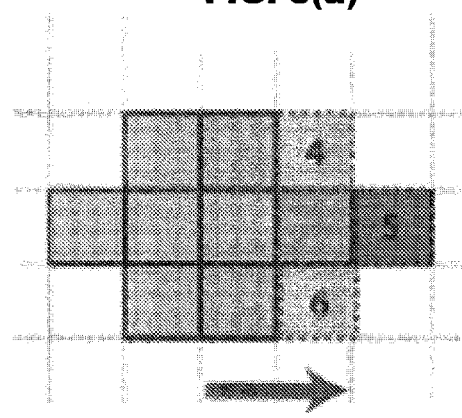
Figure 3D:
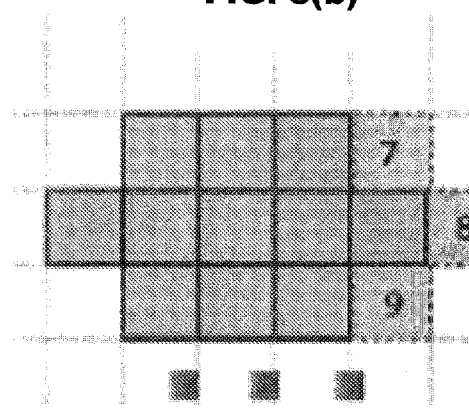

More particularly, FIG. 2(a) shows the initial condition having a "+" shaped kernel, as indicated by the gray pixels. FIG. 2(b) shows that to move the kernel one position to the right, pixels 1, 2, and 3 must satisfy some predetermined criteria; such as their average value must be below some threshold. Assuming that this criteria is met, FIG. 2(c) indicates the completed move and tries another by evaluating the intensity values of pixels 4, 5, and 6. Assuming that the average of these intensity values continues to satisfy the guiding criteria, FIG. 2(d) indicates the completed move and now evaluates the average intensity of pixels 7, 8, and 9. In this case the method finds that the average value is now above the threshold, preventing further movement to the right. (The algorithm would then continue in the remaining directions.)

Considering several voxel intensities for each move has a notable effect of tolerating image noise. Although the intensity of the noise pixel is either higher or lower than those of its neighbors, the average is still below the threshold of the guiding criteria. As a result, the iterative movement of the kernel continues until the criteria are no longer satisfied.

FIG. 3 illustrates an example process demonstrating noise tolerance. In each image, red pixels indicate noise and the white pixels indicate the desired object. In this case, the red pixel is considered noise since its intensity value is too high (or low) as compared to the average pixel intensity of its neighbors. FIG. 3(a) shows the initial condition having a "+" shaped kernel, as indicated by the gray pixels. As the kernel moves to the right as shown in FIG. 3(b), the method assesses the intensity profile {min, max, mean, std} of the newly traversed pixels 1, 2, and 3. Assuming the average of these intensities is below the stopping threshold, the kernel continues moving to the right. Although the method encounters a boundary pixel in FIG. 3(c), the average of pixel intensities at pixels 4, 5, and 6 is still below the threshold and the kernel continues to the right as shown in FIG. 3(d). In which case, intensities for pixels 7, 8, and 9 belong to the object. The iterative movement continues until the movement criteria are no longer satisfied.

In applications with objects that touch each other, the kernel maintains its shape throughout the process, which prevents it from escaping though holes and tunnels smaller than the kernel size. This key feature helps delineate objects when an explicit gradient boundary does not exist. Furthermore, embodiments can use larger or smaller kernel sizes depending on expected challenges and can even use non-spherical kernels such as a wedge, cube, cylinder, or torus to delineate objects having unique boundary features or topologies.

At each iteration, the guiding criteria are based on the statistical analysis of the intensities of several voxels, which makes the method robust to noise and inconsistencies.

For segmentation of an object with an ill-defined and noisy boundary, a larger kernel size prevents the kernel from escaping though the spaces between the fragments. This feature separates the invention from other region growing segmentation methods and enables the invention to successfully segment orbits with implicit boundaries.

In a particular application of delineating orbits from CT scans, an algorithm according to the invention is adapted for use with certain methods described in U.S. Pat. No. 8,194,964, which is specifically designed to assist a craniofacial surgeon in assessment of traumatic orbital repairs. A brief summary of the adaptation of the invention to this situation is provided here.

The method begins by segmenting the orbit in two main steps. In the first step, the invention uses a 10 cm diameter disc that is 1.5 cm thick as the kernel and simulates "pressing" this kernel into the orbit from in front of the skull. This step delineates the anterior opening by marking voxels traversed by this disc. In a second step, the invention creates a 14 mm diameter spherical kernel positioned inside the orbit. Moving this kernel outward while avoiding voxels marked by the kernel in the first step delineates the remaining portion of the orbit and completes the segmentation process. The specific size of these two kernels was chosen based on empirical data obtained by applying different kernel sizes to a wide variety of patients having different age, sex, and race.

The invention's robustness allows it to be extended to a variety of other types of anatomic segmentations, including segmentation of lateral ventricles from a MRI brain scan, lung segmentation results from a CT scan, segmenting the left kidney from an abdominal MRI scan, etc.

It should be noted that embodiments of the invention can be controlled by changing the kernel shape and size, and guiding parameters for newly traversed intensity values. Changing these parameters affects the tradeoff between noise tolerance, implicit boundary detection, and accuracy. Overall, the algorithm is easily stabilized, which is often a challenge with methods such as active contour models. Unlike deformable models, the invention is not limited to a single topology, making application versatile. For complex objects one can typically devise a multi-step strategy for delineating portions of the object in a "divide and conquer" manner. The invention is able to achieve reliable segmentation of orbits for real-world patient data by employing this strategy.

Embodiments of the invention use a "seed point" that is inside the object of interest to start the segmentation process. Determination of this seed point is application dependent and can be specified manually, computed automatically, or can be determined from landmark points on anatomic features, for example. The guiding criteria of the segmentation process can usually be determined experimentally on a representative set of images. However, this requires some amount of calibration among the input data, in the absence of which, a dynamic process can be devised. The invention's region-growing algorithm is inherently parallelizable and is amenable to multi-threading and GPGPU adaptation. Lastly, the invention is easily adapted to new segmentation problems. While the examples described herein used scalar data, the invention is easily modified to handle multivariate data such as color (RGB).

According to certain additional aspects, the present invention extends the core technology of U.S. Pat. No. 8,194,964 to provide a method and system of delineating objects from CT scans of baggage at airports. Additionally, the present invention includes a "detection" system to identify objects of interest.

This extended technology can be readily adapted to scanning, for example, packages processed by FedEx, UPS, USPS, etc. The software system in this case would preferably be exactly the same with minor modifications. Further, the technology could also be used to analyze scans of cargo containers and trucks at our ports. The software system used would preferably vary only a little from what's described below. Finally, the system described below, in terms of automation and object recognition, could be applied on medical imaging scans (CT, MRI, PET, micro-CT, etc.) of people, animals, etc. This would allow the delineation of objects from scans of people and could delineate bones, organs, etc. from the scans.

Certain general concepts relating to this adaptation of the present invention include the following.

Automatically choosing starting criteria for the core algorithm: find relatively homogeneous region to start in. Compute mipmap levels and start at the lowest level and work upwards. Start with highest intensity voxels first, then select lower intensity voxels in succession. Determine noise vs. edge for starting points. It's okay to start in a noisy region but very bad to start on an edge since this can affect automatic determination of guiding criteria for the algorithm. Choose size of kernel based on some criteria determined from the starting point, training data, or other relevant information.

Automatically determining guiding criteria based on starting criteria to guide the process: this involves tabulating guiding parameters based on starting criteria that work well for a number of objects. A data fitting operation is performed to create a function that the algorithm can use to compute guiding criteria for the segmentation process.

Method for determining object profile information from delineated objects: including min, max, mean, std of intensity values; a histogram of intensity values for whole object; a histogram of boundary intensity values; performing principal component analysis (PCA) of object voxels to establish a frame of reference; computation of histograms relative to the PCA axes or another frame of reference; determining a percentage of overlapping voxels with neighboring/touching objects; and other properties.

Aggregating delineated object parts into whole objects (i.e., for a cell phone, combining the battery, leather case, plastic case, joystick, belt hook, and internal electronics together into a single aggregate object). Merging objects can be based on overlapping edges/boundaries. This will either create a hierarchy of objects, such as a bottle containing water or will merge, for example, if the water is delineated as two separate parts, the parts can be joined together to represent the water as a whole.

Creating a material/taxonomy database that correlates delineated object information into categories of like objects.

Matching newly delineated objects to the material/taxonomy database to identify objects. Identifying objects based on composition of intensity values determined above. Or by analyzing the histograms of object voxel (intensities and position) and relating them to the database. This could include identification of objects based on hierarchical composition of "homogeneous" parts.

Red flagging certain types of objects (based on their profiles and match to the taxonomy database) for the purpose of warranting a closer inspection by opening the bag, finding the object of interest, and clearing the object/bag for travel.

Visualization tools to evaluate object profiles. Tools to view, add to, and edit the taxonomy database; and tools to devise matching and red flag criteria for detection purposes.

Remote operation of such software system to reduce onsite staff and to centralize expertise.

Method for performing whole bag analysis, i.e., where there a high amount (volume and/or mass) of metal or some other material regardless of individual objects. This can be performed by histogram analysis and other methods that examine intensity distribution within the scan.

Method for determining what's on a plane, vehicle, cargo container, etc.: if it is possible to look at all the bags that have been checked to board a plane, the aggregate of those bags can be analyzed to determine if they contain enough component parts to pose a problem.

One example of how the general process described above is adapted for analyzing CT scans of baggage is provided below.

Define a 3D kernel: In embodiments, the kernel is a 1 mm radius sphere. In other embodiments, it could be based on a "thickness" of an object of interest being segmented.

Choose a start location: Add each point in the volume in a Q ordered based on intensity. Don't start on edges. Start in homogenous regions.

Define movement criteria: Set threshold based on the Mean Intensity (MI) of the voxels at the starting location of Tumbler. Kernel moves if: Current Voxel Intensity $\epsilon[0.5*MI, 1.5*MI]$. Needs to be adaptive across intensity range and per object.

Figure 4:
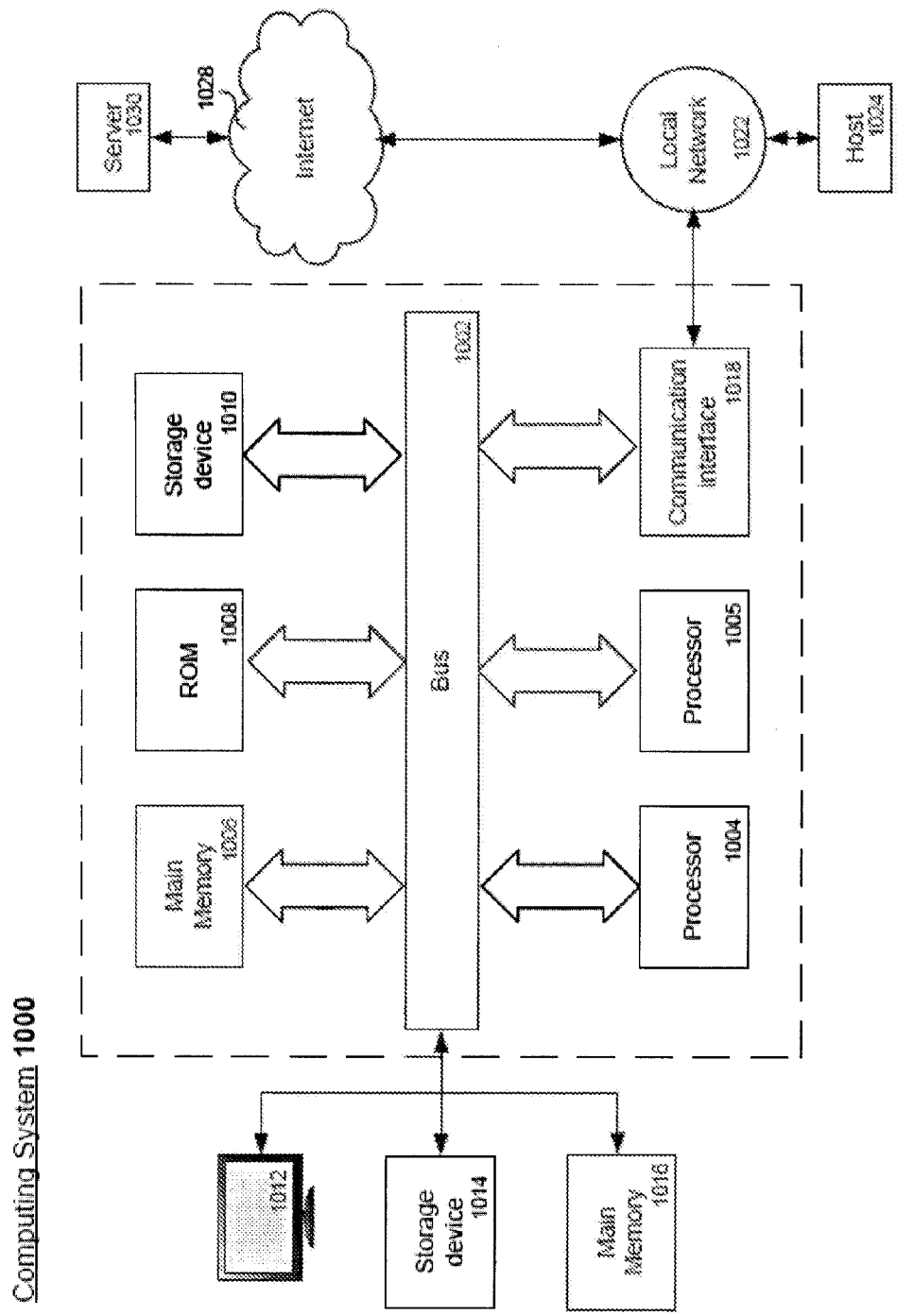
FIG. 4 is a block diagram of an example system according to embodiments of the invention.

As shown in FIG. 4, certain embodiments of the invention employ a processing system that includes at least one computing system 1000 deployed to perform certain of the steps described above. Computing systems may be a commercially available system that executes commercially available operating systems such as Microsoft Windows®, UNIX or a variant thereof, Linux, a real time operating system and or a proprietary operating system. The architecture of the computing system may be adapted, configured and/or designed for integration in the processing system, for embedding in one or more of an image capture system, a manufacturing/machining system, a graphics processing workstation and/or a surgical system or other medical management system. In one example, computing system 1000 comprises a bus 1002 and/ or other mechanisms for communicating between processors, whether those processors are integral to the computing system 100 (e.g. 1004, 1005) or located in different, perhaps physically separated computing systems 1000.

Computing system 1000 also typically comprises memory 1006 that may include one or more of random access memory ("RAM"), static memory, cache, flash memory and any other suitable type of storage device that can be coupled to bus 1002. Memory 1006 can be used for storing instructions and data that can cause one or more of processors 1004 and 1005 to perform a desired process. Main memory 1006 may be used for storing transient and/or temporary data such as variables and intermediate information generated and/or used during execution of the instructions by processor 1004 or 1005. Computing system 1000 also typically comprises non-volatile storage such as read only memory ("ROM") 1008, flash memory, memory cards or the like; non-volatile storage may be connected to the bus 1002, but may equally be connected using a high-speed universal serial bus (USB), Firewire or other such bus that is coupled to bus 1002. Non-volatile storage can be used for storing configuration, and other information, including instructions executed by processors 1004 and/or 1005. Non-volatile storage may also include mass storage device 1010, such as a magnetic disk, optical disk, flash disk that may be directly or indirectly coupled to bus 1002 and used for storing instructions to be executed by processors 1004 and/or 1005, as well as other information.

Computing system 1000 may provide an output for a display system 1012, such as an LCD flat panel display, including touch panel displays, electroluminescent display, plasma display, cathode ray tube or other display device that can be configured and adapted to receive and display information to a user of computing system 1000. In that regard, display 1012 may be provided as a remote terminal or in a session on a different computing system 1000. For example, a surgical system used in a sterile operating theater may receive images from a graphics processor that processes image data under control of a surgeon, other medical practitioner or other user. An input device 1014 is generally provided locally or through a remote system and typically provides for alphanumeric input as well as cursor control 1016 input, such as a mouse, a trackball, etc. It will be appreciated that input and output can be provided to a wireless device such as a PDA, a tablet computer or other system suitable equipped to display the images and provide user input.

According to one embodiment of the invention, portions of the methodologies described above, for example, segmenting objects of interest in an image scan, may be performed by computing system 1000. Processor 1004 executes one or more sequences of instructions. For example, such instructions may be stored in main memory 1006, having been received from a computer-readable medium such as storage device 1010. Execution of the sequences of instructions contained in main memory 1006 causes processor 1004 to perform process steps according to certain aspects of the invention. In certain embodiments, functionality may be provided by embedded computing systems that perform specific functions wherein the embedded systems employ a customized combination of hardware and software to perform a set of predefined tasks. Thus, embodiments of the invention are not limited to any specific combination of hardware circuitry and software.

The term "computer-readable medium" is used to define any medium that can store and provide instructions and other data to processor 1004 and/or 1005, particularly where the instructions are to be executed by processor 1004 and/or 1005 and/or other peripheral of the processing system. Such medium can include non-volatile storage and volatile storage. Non-volatile storage may be embodied on media such as optical or magnetic disks, including DVD, CD-ROM and BluRay. Storage may be provided locally and in physical proximity to processors 1004 and 1005 or remotely, typically by use of network connection. Non-volatile storage may be removable from computing system 1004, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, RAM, PROM, EPROM, FLASH/EEPROM, any other memory chip or cartridge, or any other medium from which a computer can read.

Transmission media can be used to connect elements of the processing system and/or components of computing system 1000. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by processor 1004 and/or 1005. For example, the instructions may initially be retrieved from a magnetic disk of a remote computer and transmitted over a network or modem to computing system 1000. The instructions may optionally be stored in a different storage or a different part of storage prior to or during execution.

Computing system 1000 may include a communication interface 1018 that provides two-way data communication over a network 1020 that can include a local network 1022, a wide area network or some combination of the two. For example, an integrated services digital network (ISDN) may be used in combination with a local area network (LAN). In another example, a LAN may include a wireless link. Network link 1020 typically provides data communication through one or more networks to other data devices. For example, network link 1020 may provide a connection through local network 1022 to a host computer 1024 or to a wide area network such as the Internet 1028. Local network 1022 and Internet 1028 may both use electrical, electromagnetic or optical signals that carry digital data streams.

Computing system 1000 can use one or more networks to send messages and data, including program code and other information. In the Internet example, a server 1030 might transmit a requested code for an application program through Internet 1028 and may receive in response a downloaded application that provides for the anatomical delineation described in the examples above. The received code may be executed by processor 1004 and/or 1005.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method, comprising:
   obtaining image data characterizing a region that includes an object of interest;
   locating a kernel at a starting point in the region, wherein the kernel comprises a plurality of adjacent pixels or voxels in the image data; and moving the kernel within the region to delineate boundaries of the object of interest.

2. A method according to claim 1, wherein the image data is from a MRI scan.

3. A method according to claim 1, wherein the image data is from a CT scan.

4. A method according to claim 1, wherein the object of interest is a portion of human anatomy.

5. A method according to claim 1, wherein the object of interest is an object within luggage.

6. A method comprising:

choosing start points within image data;

locating a kernel at the start points, wherein the kernel comprises a plurality of adjacent pixels or voxels in the image data;

moving the kernel around in a flood fill fashion to delineate object boundaries; and extracting an object from the image data after its boundaries have been delineated.

7. A method according to claim 6, further comprising repeating the choosing, locating and moving steps for a plurality of objects in the same image data.

8. A method according to claim 7, further comprising gathering statistical info from objects.

9. A method according to claim 7, further comprising determining object hierarchies by performing neighbor analysis that determines what objects are touching one another.

10. A method according to claim 6, further comprising tracking an object over time using multiple sets of image data.

11. A method according to claim 6, wherein the image data is two-dimensional.

12. A method according to claim 6, wherein the image data is three-dimensional.

13. A method according to claim 6, wherein the image data is one of two-dimensional xrays, photographs, PET scans, PET/CT scans, and neutron imaging.

14. A method according to claim 6, further comprising choosing a size and shape of the kernel to use.

* * * * *